United States Patent
Biggs, Jr.

(10) Patent No.: US 7,656,128 B2
(45) Date of Patent: Feb. 2, 2010

(54) SYSTEM AND METHOD FOR CHARGING AND PULSATING BATTERIES

(75) Inventor: Daniel C. Biggs, Jr., Reminderville, OH (US)

(73) Assignee: Canadus Power Systems, LLC, Warrensville Heights, OH (US)

(*) Notice: Subject to any disclaimer, the term of this patent is extended or adjusted under 35 U.S.C. 154(b) by 51 days.

(21) Appl. No.: 11/786,651

(22) Filed: Apr. 12, 2007

(65) Prior Publication Data

US 2008/0252260 A1 Oct. 16, 2008

(51) Int. Cl.
*H02J 7/04* (2006.01)
*H02J 7/16* (2006.01)

(52) U.S. Cl. ............................ 320/139; 320/141

(58) Field of Classification Search ............ 320/139, 320/141
See application file for complete search history.

(56) References Cited

U.S. PATENT DOCUMENTS

| | | | | |
|---|---|---|---|---|
| 3,922,672 A | | 11/1975 | Birt et al. | |
| 4,146,829 A | * | 3/1979 | Rinaldi | 320/135 |
| 5,063,341 A | * | 11/1991 | Gali | 320/160 |
| 5,525,892 A | * | 6/1996 | Phommarath | 320/139 |
| 5,648,714 A | * | 7/1997 | Eryou et al. | 320/139 |
| 5,677,612 A | * | 10/1997 | Campagnuolo et al. | 320/141 |
| 6,078,166 A | * | 6/2000 | Taricco | 320/141 |
| 6,172,486 B1 | * | 1/2001 | Campagnuolo et al. | 320/141 |
| 6,307,352 B1 | | 10/2001 | Hooper | |
| 2002/0033691 A1 | * | 3/2002 | Rolfes | 320/134 |

FOREIGN PATENT DOCUMENTS

JP 05282084 A * 10/1993

OTHER PUBLICATIONS

PCT, International Search Report and Written Opinion, PCT/US2008/059329 (Aug. 15, 2008).

* cited by examiner

*Primary Examiner*—Edward Tso
*Assistant Examiner*—Samuel Berhanu
(74) *Attorney, Agent, or Firm*—Thompson Hine LLP

(57) ABSTRACT

A battery charging and pulsating system including a battery having a positive terminal and a negative terminal, a charger connected to the positive and negative terminals of the battery, the charger including a controller, a pulsator connected to the positive and negative terminals of the battery and a filter positioned between the charger and the pulsator to filter signals received from the pulsator.

14 Claims, 7 Drawing Sheets

SYSTEM AND METHOD FOR CHARGING AND PULSATING BATTERIES

BACKGROUND

The present application is directed to the art of battery charging and, more particularly, to systems and methods for charging and pulsating batteries.

Various deposits, such as lead sulfate deposits, often are generated as byproducts of the electro-chemical reaction that takes place when a battery is discharged. The accumulation of such deposits within the battery may degrade the operation of the battery and, if sufficient accumulation is present, may short circuit the battery.

Pulsation devices have been developed to counteract the accumulation of such deposits by applying pulsation energy, such as radio frequency energy, to the battery. Without being limited to any particular theory, it is believed that pulsation energy breaks down the accumulated deposits and facilitates free electron flow between the battery plates.

Typical pulsation devices emit an unwanted signal that may confuse the battery charger and may result in a battery not receiving a full charge. Furthermore, pulsation devices may cause the battery charger to run much longer than is necessary to charge a battery, which may produce excess hydrogen gas and creates a safety hazard.

Accordingly, there is a need for a system and method for charging and pulsating batteries, while limiting undesired side effects.

SUMMARY

In one aspect, a battery charging and pulsating system may include a battery having a positive terminal and a negative terminal, a charger connected to the positive and negative terminals of the battery, the charger including a controller, a pulsator connected to the positive and negative terminals of the battery and a filter positioned between the charger and the pulsator to filter signals received from the pulsator.

In another aspect, a battery charging and pulsating system may include a battery having a positive terminal and a negative terminal, a charger electrically connected to the positive and negative terminals of the battery, the charger including a controller, a pulsator electrically connected to the positive and negative terminals of the battery, the pulsator including a controller, and a voltage measuring circuit electrically connected to the positive and negative terminals of the battery, the voltage measuring circuit being adapted to measure a voltage across the positive and negative terminals of the battery, wherein the controller of the pulsator is adapted to activate the pulsator when the measured voltage is (1) at or below a predetermined threshold voltage and/or (2) at or above a predetermined gassing voltage.

In another aspect, a battery charging and pulsating system may include a battery having a positive terminal and a negative terminal, a charger electrically connected to the positive and negative terminals of the battery, the charger including a controller, and a pulsator electrically connected to the positive and negative terminals of the battery, the pulsator including a controller, wherein the controller of the pulsator is in communication with the controller of the charger, and wherein the controller of the pulsator is adapted to activate the pulsator only when the controller of the charger provides an indication that the charger is inactive.

In another aspect, a battery charging and pulsating system may include a battery having a positive terminal and a negative terminal, a charger electrically connected to the positive and negative terminals of the battery, the charger including a controller, and a pulsator electrically connected to the positive and negative terminals of the battery, the pulsator including a controller, wherein the controller of the pulsator is determining by means of a voltage or current measurement that the charger is inactive and wherein the controller of the pulsator is adapted to activate the pulsator only when the controller of the pulsator determines that the charger is inactive.

In another aspect, a battery charging and pulsating system may include a battery having a positive terminal and a negative terminal, a charger electrically connected to the positive and negative terminals of the battery, the charger including a controller, a pulsator electrically connected to the positive and negative terminals of the battery, the pulsator including an internal circuit having a capacitor, and a switching device disposed between the capacitor and the charger, wherein the switching device is adapted to electrically isolate the charger from the capacitor.

In another aspect, a battery charging and pulsating system may include a battery having a positive terminal and a negative terminal, a charger electrically connected to the positive and negative terminals of the battery, the charger including a controller, a pulsator electrically connected to the positive and negative terminals of the battery, the pulsator including an internal circuit having a capacitor, wherein the capacitor is adapted to store a voltage, and a resistive device selectively disposed between the capacitor and the charger, wherein the resistive device is adapted to dissipate the voltage from the capacitor.

Other aspects of the disclosed system and method for charging and pulsating batteries will become apparent from the following description, the accompanying drawings and the appended claims.

DETAILED DESCRIPTION

Figure 1A:
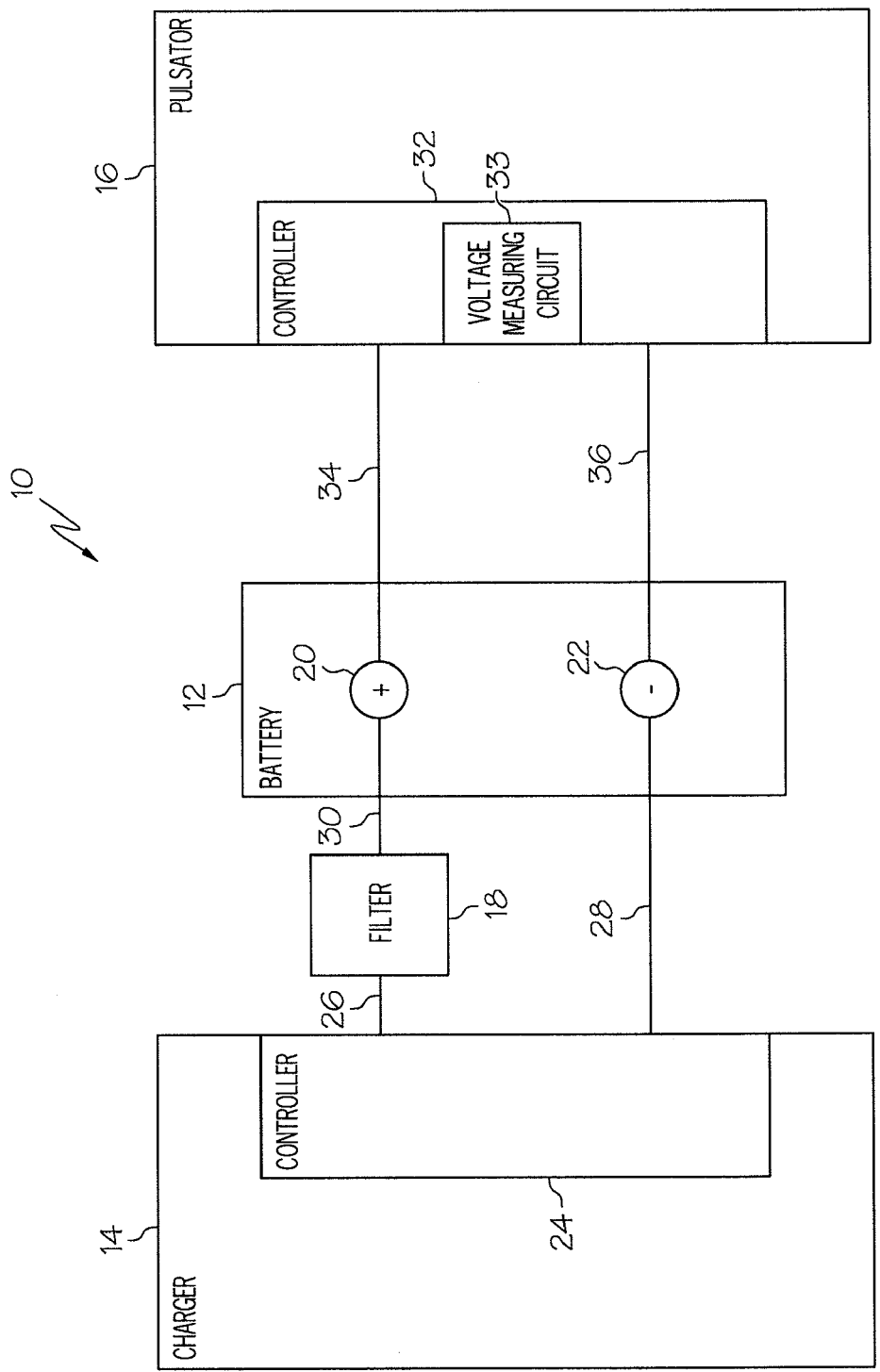
FIG. 1a is a block diagram of a first aspect of the disclosed system for charging and pulsating batteries.

Referring to FIG. 1a, a first aspect of the disclosed battery charging and pulsating system, generally designated 10, may include a battery 12, a battery charger 14, a pulsation device or battery pulsator 16 and a filter 18. The battery 12 may include a positive terminal 20 and a negative terminal 22. The battery charger 14 may include a controller 24 and may be connected to the filter 18 by a first connection line 26 and the negative terminal 22 of the battery 12 by a second connection line 28. The filter 18 may be connected to the positive terminal 20 of the battery 12 by a third connection line 30. The battery pulsator 16 may include a controller 32 and may be connected to the positive terminal 20 of the battery 12 by a fourth connection line 34 and the negative terminal 22 of the battery 12 by a fifth connection line 36.

The battery 12 may include metal plates (e.g., lead plates) (not shown) and an electrolyte solution (e.g., sulfuric acid) (not shown). The battery 12 may be charged by connecting the battery 12 to the charger 14 by connection lines 26, 28, 30 such that the charger 14 may apply a voltage greater than the voltage rating of the battery 12, thereby forcing current to flow from the charger 14 and into the battery 14.

The pulsator 16 may apply high-frequency pulsation energy (e.g., radio-frequency energy) to the battery 12 by way of the connection lines 34, 36. The controller 32 of the pulsator 16 may include a voltage measuring circuit 33 and may prevent operation of the pulsator 16 when the voltage across the terminals 20, 22 of the battery 12 is less than a predetermined threshold voltage (e.g., 2.15 volts per cell). The use of a predetermined threshold or "trigger" voltage is described in greater detail in U.S. Pat. No. 5,648,714 to Eryou et al., the entire contents of which are incorporated herein by reference. Therefore, in one aspect, the pulsator 16 may only pulsate (i.e., apply pulsation energy) when a charging voltage is being applied to the battery 12 by the charger 14 or when the surface charge voltage is sufficiently high such that the voltage across the terminals 20, 22 is equal to or greater than the predetermined threshold voltage.

However, it has been discovered that controlling such a system 10 based upon a predetermined threshold voltage may produce the undesirable side effect of generating a signal that, if received by the controller 24 of the charger 14, may cause the charger 14 to shut off too early, shut off too late or not shut off at all.

Accordingly, the disclosed system 10 may include a filter 18 positioned between the controller 24 of the charger 14 and the pulsator 16 to filter such undesired signals and eliminate or reduce the effects the pulsator 16 has on the charger 14. For example, the filter 18 may be positioned between the controller 24 of the charger 14 and the terminals 20, 22.

In one aspect, the filter 18 may reduce the amplitude and/or intensity of the electrical signals emitted from the pulsator 16, thereby dampening the signals before they are received by the controller 24 of the charger 14.

Figure 2A:
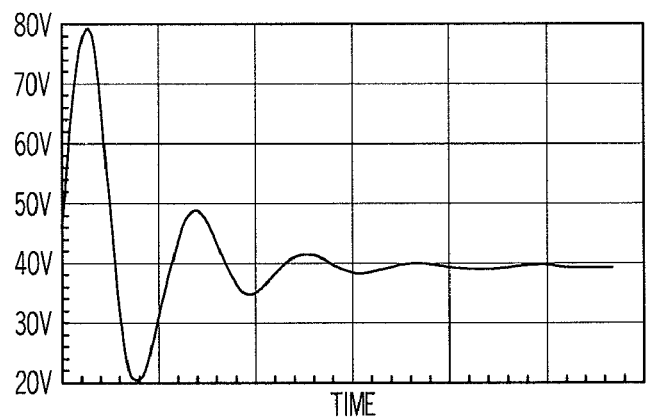
FIG. 2a is a graphical illustration of voltage versus time for the system of FIG. 1a before signal attenuation.
Figure 2B:
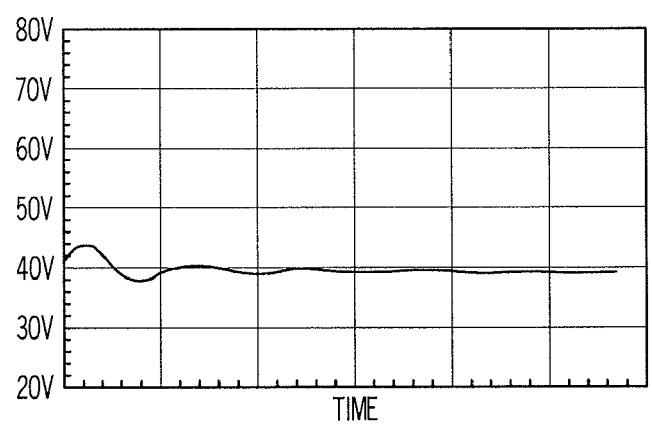
FIG. 2b is a graphical illustration of voltage versus time for the system of FIG. 1a after signal attenuation.

Referring to FIGS. 2a and 2b, an unfiltered signal (FIG. 2a) may enter the filter 18 by way of connection line 30 and may exit the filter 18 as a filtered or attenuated signal (FIG. 2b) and may be communicated to the controller 24 of the charger 14 from the filter 18 by way of the connection line 26. For example, filter 18 may reduce the amplitude of the signal (FIG. 2a) by about 95% (FIG. 2b).

At this point, those skilled in the art will appreciate that attenuation of the signal received from the pulsator 16 may reduce the energy contained in the signal and may prevent the signal from registering with the controller 24 of the charger 14. Thus, unwanted interactions between the pulsator 16 and the charger 14 may be reduced or eliminated by filtering the signal from the pulsator 16 prior to passing the signal to the charger 14.

Figure 1B:
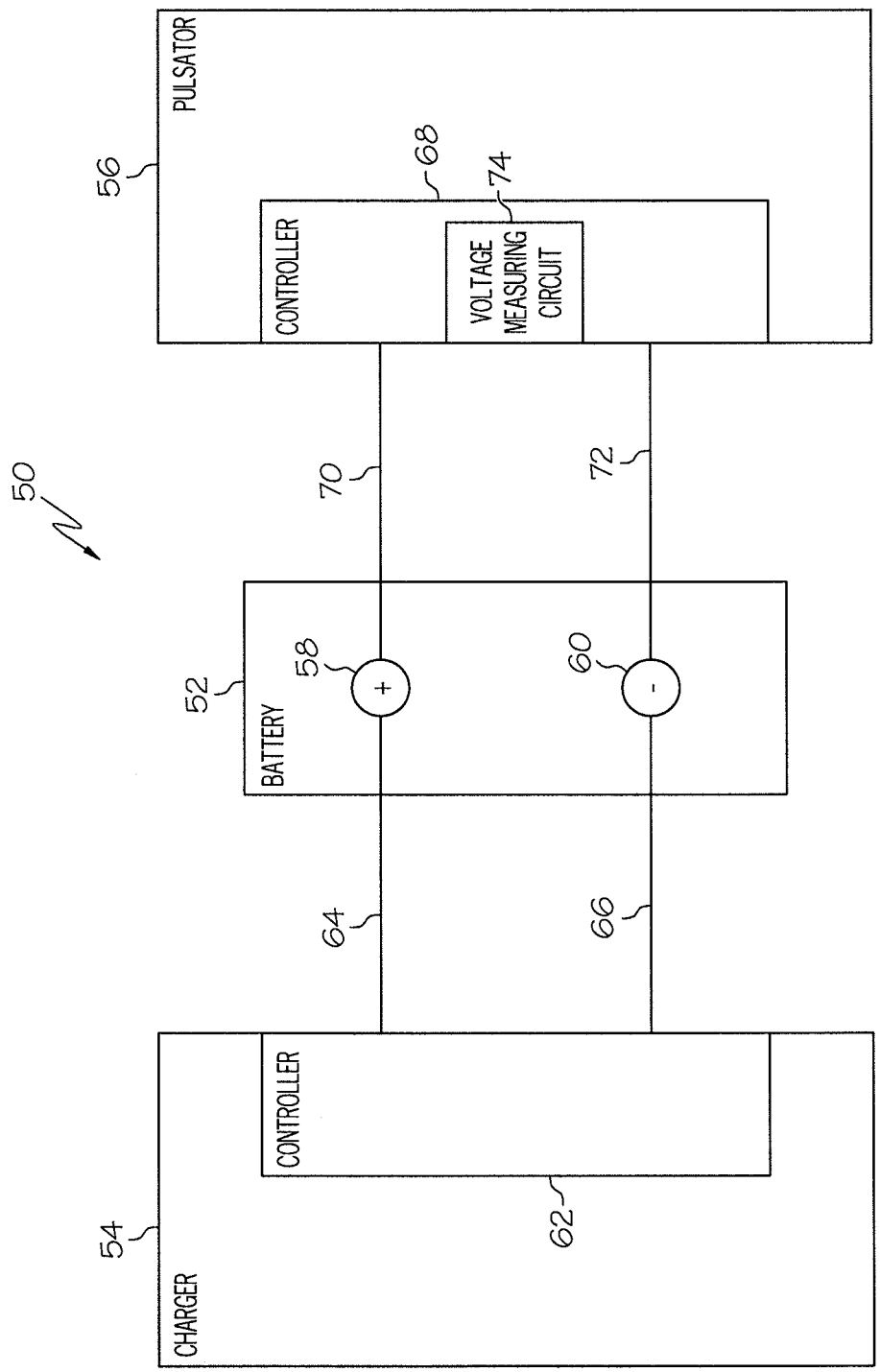
FIG. 1b is a block diagram of a second aspect of the disclosed system for charging and pulsating batteries.

Referring to FIG. 1b, a second aspect of the disclosed battery charging and pulsating system, generally designated 50, may include a battery 52, a battery charger 54 and a battery pulsator 56. The battery 52 may include a positive terminal 58 and a negative terminal 60. The battery charger 54 may include a controller 62 and may be connected to the positive terminal 58 of the battery 52 by a first connection line 64 and the negative terminal 60 of the battery 52 by a second connection line 66. The battery pulsator 56 may include a controller 68 and may be connected to the positive terminal 58 of the battery 52 by a third connection line 70 and the negative terminal 60 of the battery 52 by a fourth connection line 72.

As discussed above, it has been discovered that using a charger 54 together with a pulsator 56 may produce the undesirable side effect of generating a signal that, if received by the controller 62 of the charger 54, may cause the charger 54 to shut off too early, shut off too late or not shut off at all.

Accordingly, the disclosed system 50 may include functionality that prevents interaction from occuring between the pulsator 56 and the charger 54 by activating the pulsator 56 only when the charger 54 is not charging. For example, the pulsator 56 may only be activated to supply pulsation energy when the charger 54 is not supplying a charging current to the battery 52 and the battery 52 has received a partial or full charge (i.e., post charge pulsation). Therefore, those skilled in the art will appreciate that interactions between the charger 54 and the pulsator 56 may be reduced or eliminated by not operating the pulsator 56 when the charger 54 is operating.

In one aspect, the controller 68 of the pulsator 56 may include a voltage measuring circuit 74 adapted to monitor the voltage across the terminals 58, 60 of the battery 52 to detect when the charger 54 is active (i.e., voltage across terminals 58, 60 is above the predetermined threshold voltage) and inactive (i.e., voltage across terminals 58, 60 is below the predetermined threshold voltage). Those skilled in the art will appreciate that a current measuring circuit may also be used without departing from the scope of the present disclosure. When the voltage across the terminals 58, 60 drops below a predetermined threshold value, the pulsator 56 may be actuated and may begin supplying pulsation energy to the battery 52. For example, the pulsator 56 may be actuated only when the voltage across the terminals 58, 60 drops below 2.15 volts per cell of the battery 52 (i.e., the predetermined threshold voltage).

Thus, the controller 68 of the pulsator 56 may monitor the charger 54 to determine whether the charger 54 is active and may only activate the pulsator 56 when it is determined that the charger 54 is inactive.

Optionally, the controller 68 of the pulsator 56 may operate the pulsator 56 on a delay such that the pulsator 56 is only activated when the voltage across the terminals 58, 60 of the battery 52 drops below the predetermined threshold voltage and remains below the predetermined threshold voltage for a predetermined period of time (i.e., a delay period).

Figure 5:
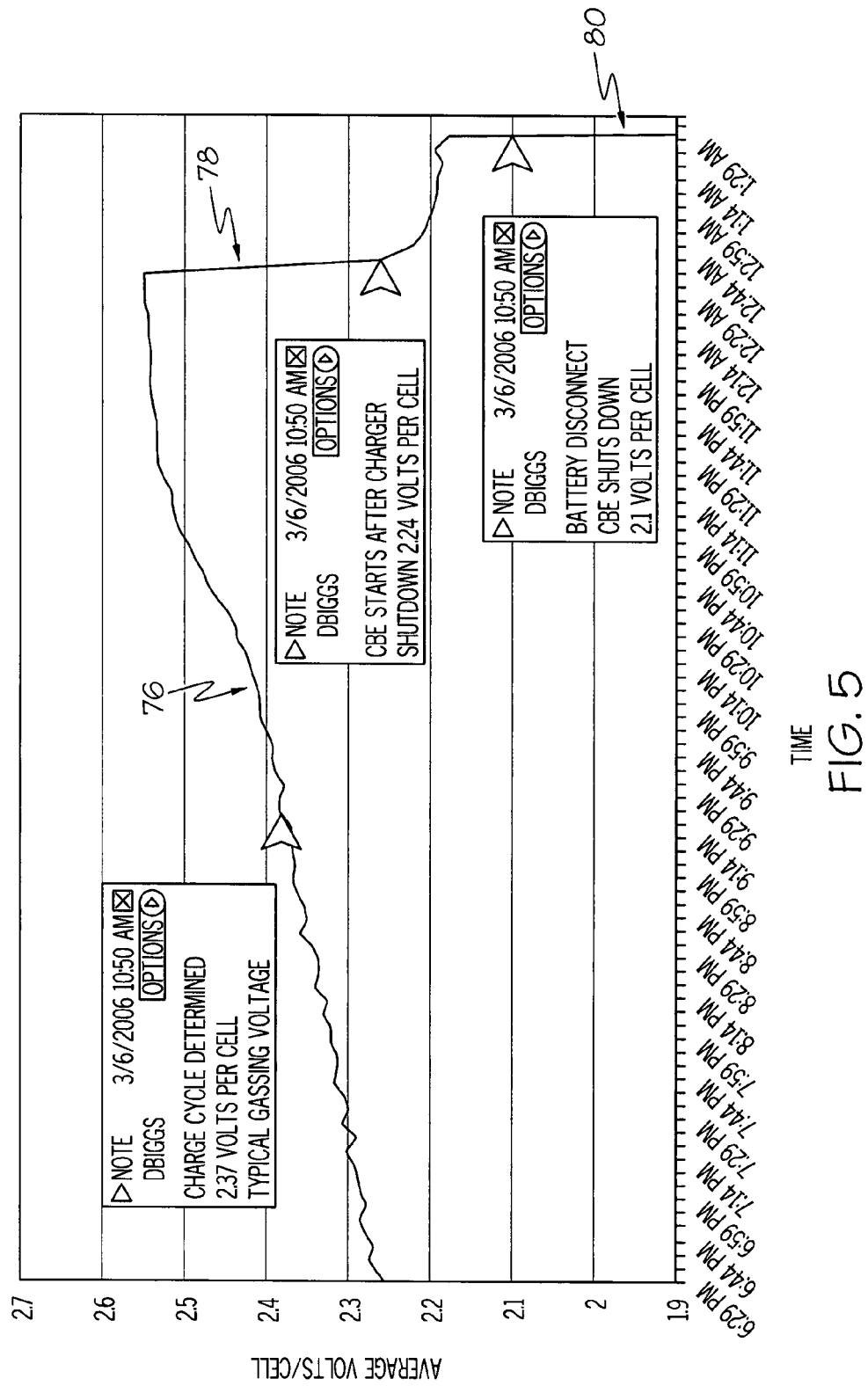
FIG. 5 is a graphical illustration of average voltage per battery cell versus time according to the system of FIG. 1b.

Referring to FIG. 5, the average voltage per cell of the battery 52 is shown versus time. Section 76 of the graph shows the voltage increase as the battery 52 is charged. Once the battery 52 is fully charged, the charger 54 may be deactivated and the voltage may drop, as shown by section 78 of the graph. The first drop in voltage (section 78) may be detected by the voltage measuring circuit 74 and may signal the activation of the pulsator 56. A second voltage drop below a second predetermined value (section 80) may be detected when the battery 52 is disconnected from the pulsator 56, thereby signaling the pulsator 56 to deactivate (i.e., stop pulsating).

In another aspect, the pulsator 56 may be configured to operate only after a gassing voltage of the battery 52 has been detected by the voltage measuring circuit 74. The "gassing voltage" may be a voltage at which a side effect reaction is initiated during which water in the battery 52 is converted into visible hydrogen and oxygen gas bubbles. For example, for a typical battery 52, the gassing voltage may be achieved when the battery approaches about 80% of a full charge.

Accordingly, it has been discovered that when the gassing voltage is reached the charger 54 may enter a timing mode that deactivates the charger 54 after a predetermined amount of time. Since, at this point, the charger 54 may no longer measure voltage, operating the pulsator 56 after the gassing voltage has been detected should provide little or no interaction between the pulsator 56 and the charger 54.

In another aspect, the pulsator 56 may be in communication with the charger 54 such that the pulsator 56 may deactivate when the charger 54 is activated. For example, the controller 68 of the pulsator 56 may receive signals from the controller 62 of the charger 54 indicative of when the charger 54 is active such that the pulsator 56 is only active (i.e., pulsating) when the charger 54 is inactive (i.e., not charging). However, those skilled in the art will appreciate that a single controller or processor may be used to control both the pulsator 56 and the charger 54 without departing from the scope of the present disclosure.

Thus, the system 50 may reduce or eliminate unwanted interactions between the pulsator 56 and the charger 54 caused by pulse charges and top off charges that occur after the battery 52 is charged. The pulsator 56 may also be prevented from operating when the charger 54 is first activated. Furthermore, a delay may be employed to prevent the pulsator 56 from operating during short periods when the charger 54 is interrupted.

Figure 1C:
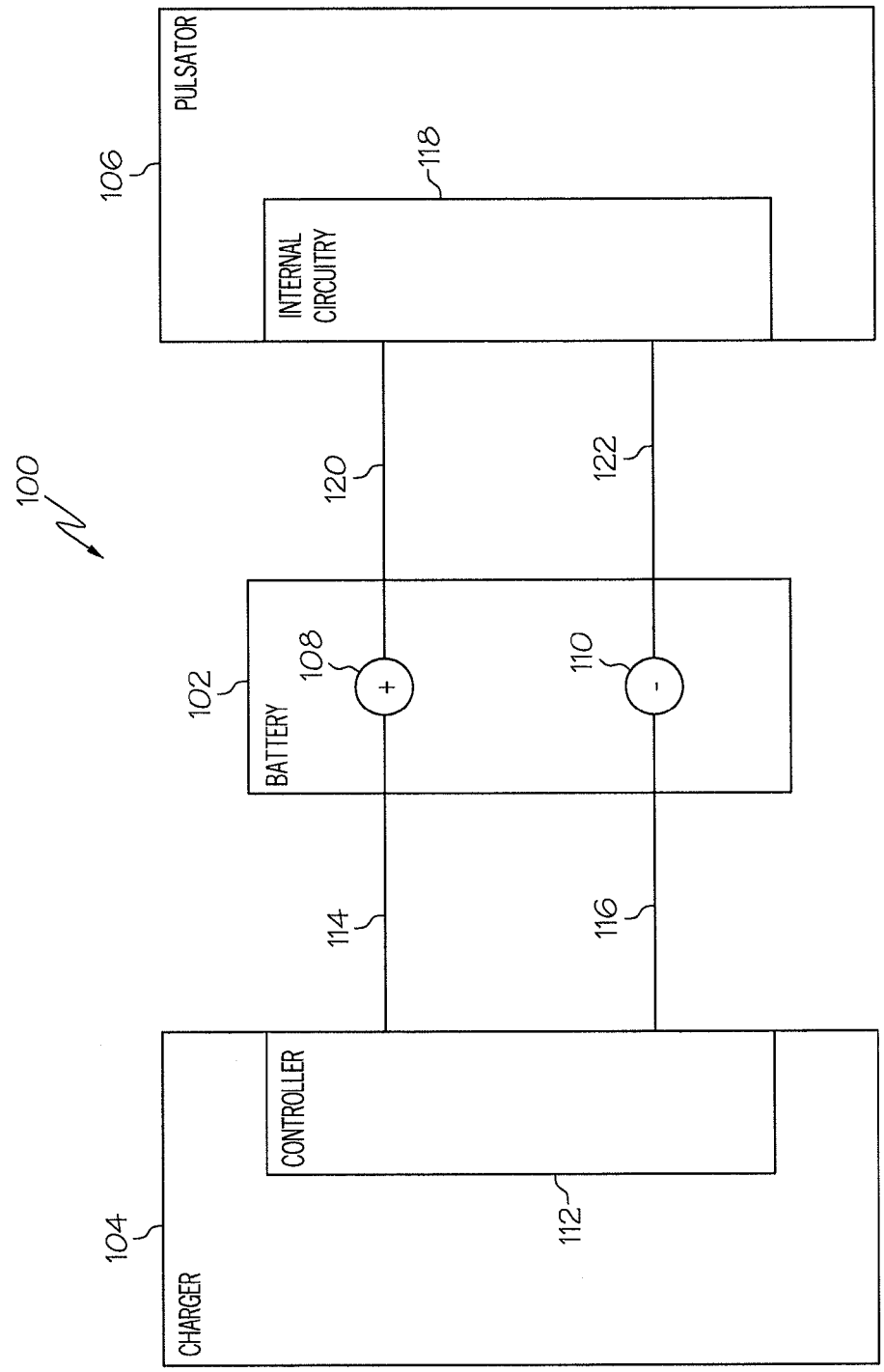
FIG. 1c is a block diagram of a third aspect of the disclosed system for charging and pulsating batteries.

Referring to FIG. 1c, a third aspect of the disclosed battery charging and pulsating system, generally designated 100, may include a battery 102, a battery charger 104 and a battery pulsator 106. The battery 102 may include a positive terminal 108 and a negative terminal 110. The battery charger 104 may include a controller 112 and may be connected to the positive terminal 108 of the battery 102 by a first connection line 114 and the negative terminal 110 of the battery 102 by a second connection line 116. The battery pulsator 106 may include internal circuitry 118 and may be connected to the positive terminal 108 of the battery 102 by a third connection line 120 and the negative terminal 110 of the battery 102 by a fourth connection line 122.

Figure 3:
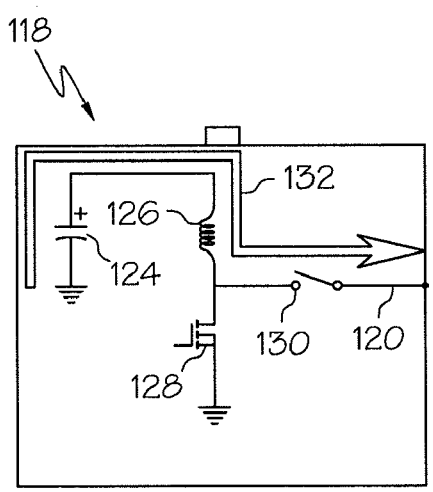
FIG. 3 is a schematic illustration of the internal circuitry of the pulsator of the system of FIG. 1c.

The internal circuitry 118 may be any circuit capable of generating a pulse and may have an internal capacitance. For example, referring to FIG. 3, the internal circuitry 118 of the pulsator 106 may include a capacitor 124, an inductor 126, a transistor 128 and a switch 130. The capacitor 124, inductor 126 and transistor 128 may collectively operate to generate a pulse. The capacitor 124 may be used to hold a minimum amount of capacitance and a voltage necessary to operate the pulsator 106. However, the capacitor 124 may also produce undesirable side effect interactions with the battery charger 104 and may keep the system 100 active after the charged battery 102 has been removed from the charger 104.

Figure 4A:
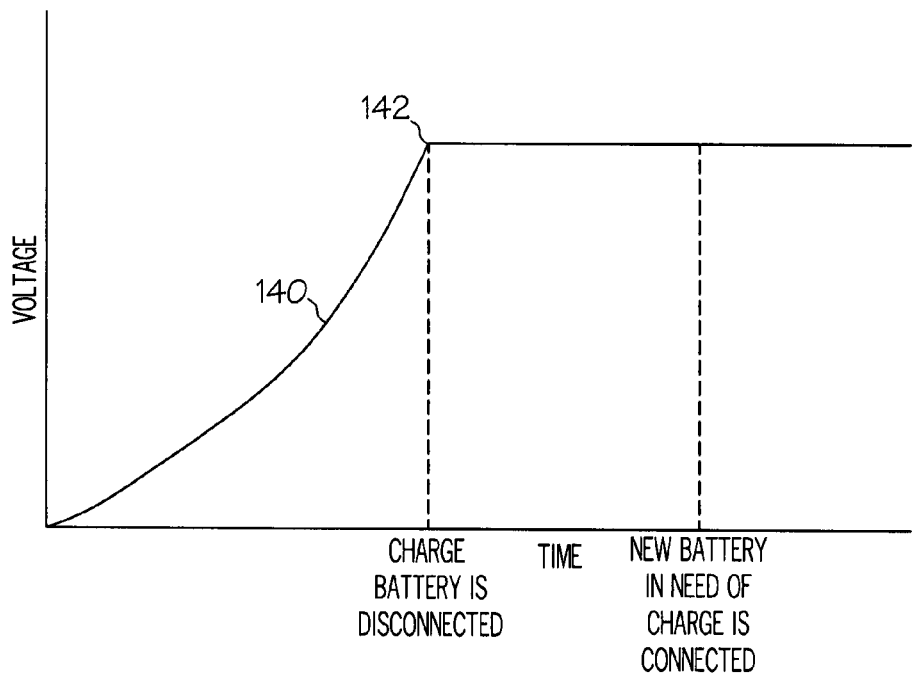
FIG. 4a is a graphical illustration of voltage versus time of the system of FIG. 1c before either bleeding or disconnecting the voltage from the charger after the pulsator has determined that the battery has been removed.

Referring to FIG. 4a, the retained charge may persist as the voltage accumulated during battery charging (section 140 of the graph) is maintained even after the charged battery is disconnected (section 142 of the graph). The active circuit 118 may send an unwanted signal to the controller 112 of the charger 104 indicating incorrectly that the battery 102 is still connected to the charger 104. This can prevent the controller 112 from determining that the fully charged battery 102 may have been disconnected and may have been removed from the system 100, thereby potentially presenting a problem for the next new battery 102 in need of a charge. When a new battery 102 is connected to the charger 104, the charger 104 may erroneously perceive that this new battery is the former, previously disconnected and already charged battery 102. Since the charger 104 may believe that the former battery 102 is already fully charged, the charger 104 may not fully charge the new battery 102 that is actually connected to the charger 104. This may be an inconvenience to a user expecting the new battery to be fully charged.

Accordingly, the disclosed system 100 may include functionality for allowing the system 100 to determine that the battery 102 has been disconnected from the system 100 and/or to minimize or eliminate the interactions caused by the capacitor 124.

Figure 4B:
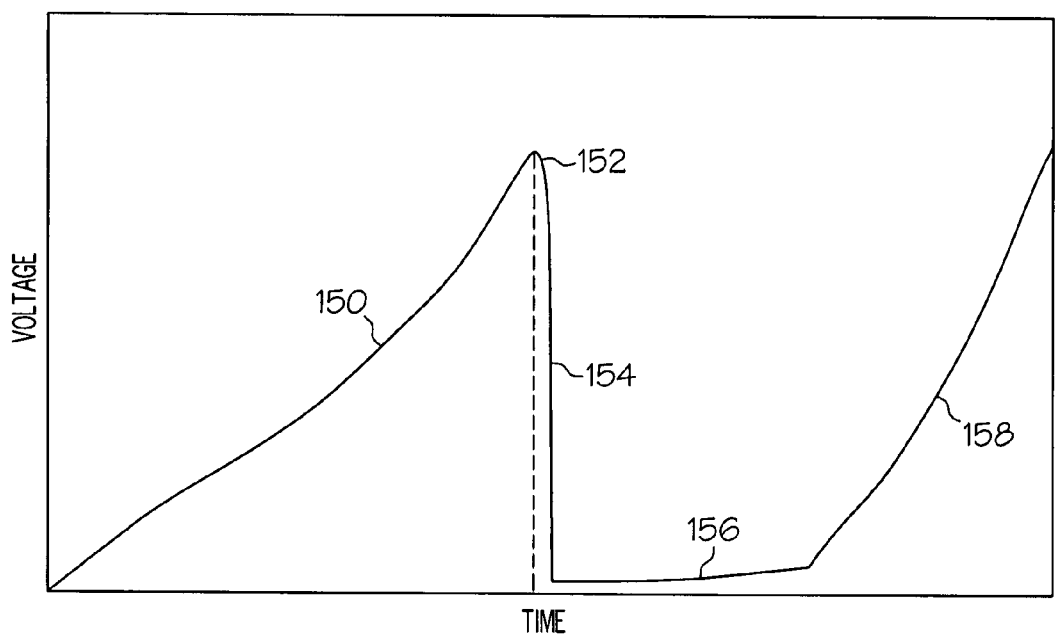
FIG. 4b is a graphical illustration of voltage versus time of the system of FIG. 1c after either bleeding or disconnecting the voltage from the charger after the pulsator has determined that the battery has been disconnected.

In one aspect, the controller 112 of the charger 104 may measure the battery voltage during charging and may determine, either electronically or manually, that the battery 102 may have in fact been disconnected. Referring to FIG. 4b, when the battery 102 is charging, voltage can build (section 150 of the graph) and may reach a maximum voltage (section 152 of the graph) when the battery 102 is fully charged. When the charged battery 102 is removed from the system 100, the voltage may drop to zero (section 154 of the graph). Once the controller 112 of the charger 104 registers the voltage drop, it may recognize that the voltage remains at zero (section 156 of the graph) and may determine that the old charged battery 102 has been disconnected from the system 100. When a new battery is connected, the controller 112 of the charger 104 may recognize that a new battery 102 is connected and can reinitiate the charging cycle for a new battery 102 to be charged. The voltage may build as the new battery charges (section 158 of the graph) and the charge within the capacitor 124 may be dissipated.

In another aspect, when the pulsator 106 is inactive, the switch 130 may be opened to electrically isolate the capacitor 124 from the system 100, thereby preventing interactions between the pulsator 106 and the charger 104. The switch 130 may be a relay, a proximity switch, a solid state switch or any device capable of disconnect and may be positioned between the capacitor 124 and the charger 104 to prevent the charger 104 from detecting the voltage dissipated by the capacitor 124. Interrupting the signal flow would cause the voltage to drop to zero.

In another aspect, the controller 112 of the charger 104 may be prevented from detecting the voltage from the pulsator 106 by positioning a resistor (not shown), or other device capable of dissipating voltage, in the internal circuitry 118 of the pulsator 106 between the capacitor 124 and the charger 104 to bleed off or absorb the charge in the capacitor 124. For example, a resistor may be positioned in the internal circuitry 118 of the pulsator 106 between the connection line 120 and ground.

In another aspect, the transistor 128 may be selectively actuated to shunt the voltage accumulated in the capacitor 124 to ground.

In another aspect, the charger 104 can interrupt the control signal before it reaches the controller 112 and may reconnect the signal when a new battery 102 has been introduced to the system 100.

Figure 1D:
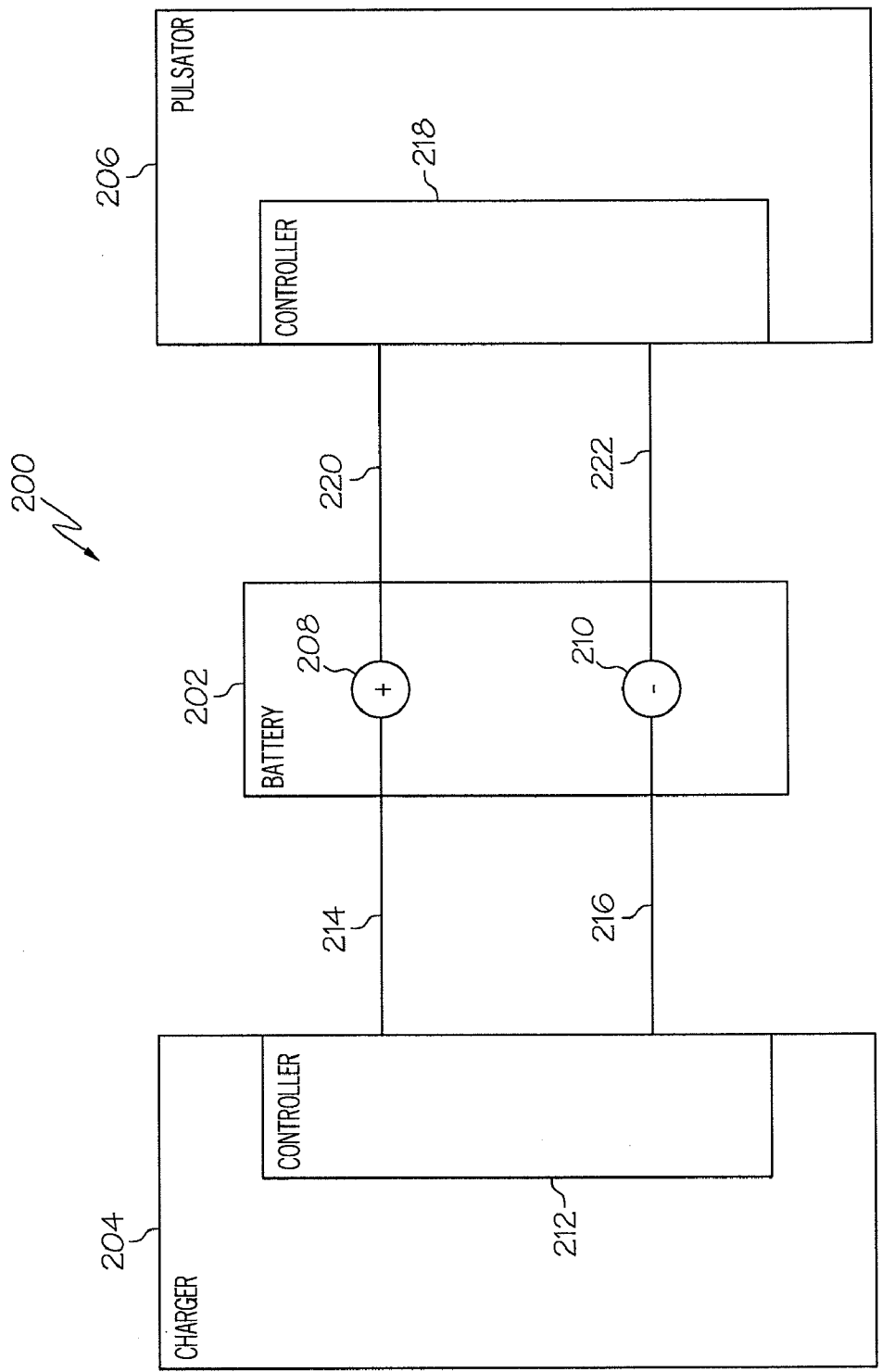
FIG. 1d is a block diagram of a fourth aspect of the disclosed system for charging and pulsating batteries.

Referring to FIG. 1d, a fourth aspect of the disclosed battery charging and pulsating system, generally designated 200, may include a battery 202, a battery charger 204 and a battery pulsator 206. The battery 202 may include a positive terminal 208 and a negative terminal 210. The battery charger 204 may include a controller 212 and may be connected to the positive terminal 208 of the battery 202 by a first connection line 214 and the negative terminal 210 of the battery 202 by a second connection line 216. The battery pulsator 206 may include a controller 218 and may be connected to the positive terminal 208 of the battery 202 by a third connection line 220 and the negative terminal 210 of the battery 202 by a fourth connection line 222.

The controller 218 of the pulsator 206 may be adapted to control the operation of the pulsator 206 to limit the exposure of the pulsator 206 and avoid problems associated with over pulsating the battery 202. For example, over pulsating a battery 202 may remove excessive amounts of deposit, thereby potentially creating a short circuit between the plates of the battery 202.

In one aspect, the controller 218 of the pulsator 206 may limit the operation of the pulsator 206 to a predetermined amount of time. For example, the controller 218 may only operate the pulsator 206 for at most about 3 continuous hours.

In another aspect, the controller 218 of the pulsator 206 may operate the pulsator 206 only during a predetermined voltage window. For example, the controller 218 may only operate the pulsator 206 when the voltage across the terminals 208, 210 of the battery 202 is between about 2.40 and 2.60 volts per cell.

In another aspect, the controller 218 of the pulsator 206 may operate the pulsator 206 according to a predetermined schedule of operation. The schedule may be constant (e.g., the pulsator 206 may be activated once every 5 charge cycles) or may vary (e.g., the pulsator 206 may be activated every fifth charge cycle for the first 10 cycles, every other cycle for the next 20 cycles and every cycle thereafter).

In one aspect, the controller 218 of the pulsator 206 may modify the pulse strength of the pulsator 206. This control can also be achieved by adjusting the time the pulsator 206 is activated through use of a timer or may be activated at specific voltages or at a specific range of voltages.

Although various aspects of the disclosed system and method for charging and pulsating batteries have been shown and described, modifications may occur to those skilled in the art upon reading the specification. The present application includes such modifications and is limited only by the scope of the claims.

What is claimed is:

1. A battery charging and pulsating system comprising:
    a battery having a positive terminal and a negative terminal;
    a charger connected to said positive and said negative terminals of said battery, said charger including a controller;
    a battery pulsator connected to said battery to supply high-frequency pulsation energy to said positive and said negative terminals of said battery to desulfate said battery; and
    a filter positioned between said controller of said charger and said pulsator, said filter being configured to reduce at least one of an amplitude and an intensity of said pulsation energy prior to said pulsation energy reaching said controller.

2. The system of claim 1 further comprising a schedule of operation for operating said pulsator, wherein said pulsator is activated according to said schedule of operation.

3. The system of claim 2 wherein said schedule of operation is a varied schedule of operation having at least a first portion and a second portion, said second portion occuring at a time after said first portion, wherein said pulsator is operated less frequently during said first portion than during said second portion.

4. The system of claim 1 wherein said controller of said pulsator is adapted to activate said pulsator after a delay period.

5. The system of claim 1 wherein said charger is deactivated when said controller of said charger determines that said battery is disconnected from said charger.

6. A battery charging and pulsating system comprising:
    a battery having a positive terminal and a negative terminal;
    a charger electrically connected to said positive and said negative terminals of said battery, said charger including a controller;
    a battery pulsator connected to said battery to supply high-frequency pulsation energy to said positive and said negative terminals of said battery to desulfate said battery, said pulsator including an internal circuit having a capacitor;
    a switching device disposed between said capacitor and said charger, wherein said switching device is adapted to electrically isolate said charger from said capacitor; and
    a filter positioned between said controller of said charger and said pulsator, said filter being configured to reduce at least one of an amplitude and an intensity of said pulsation energy prior to said pulsation energy reaching said controller.

7. The system of claim 6 wherein said switching device is at least one of a relay, a proximity switch and a solid state switch.

8. The system of claim 6 wherein said switching device is associated with said internal circuit of said pulsator.

9. The system of claim 6 further comprising a schedule of operation for operating said pulsator, wherein said pulsator is activated according to said schedule of operation.

10. The system of claim 9 wherein said schedule of operation is a varied schedule of operation having at least a first portion and a second portion, said second portion occuring at a time after said first portion, wherein said pulsator is operated less frequently during said first portion than during said second portion.

11. The system of claim 6 further comprising a transistor electrically connected to said capacitor to shunt voltage accumulated in said capacitor.

12. A battery charging and pulsating system comprising:
    a battery having a positive terminal and a negative terminal;
    a charger electrically connected to said positive and said negative terminals of said battery, said charger including a controller;
    a battery pulsator configured connected to said battery to supply high-frequency pulsation energy to said positive and said negative terminals of said battery, said pulsator including an internal circuit having a capacitor, wherein said capacitor is adapted to store a voltage;
    a resistive device selectively disposed between said capacitor and said charger, wherein said resistive device is adapted to dissipate said voltage from said capacitor; and
    a filter positioned between said controller of said charger and said pulsator said filter being configured to reduce at least one of an amplitude and an intensity of said pulsation energy prior to said pulsation energy reaching said controller.

13. The system of claim 12 further comprising a schedule of operation for operating said pulsator, wherein said pulsator is activated according to said schedule of operation.

14. The system of claim 13 wherein said schedule of operation is a varied schedule of operation having at least a first portion and a second portion, said second portion occuring at a time after said first portion, wherein said pulsator is operated less frequently during said first portion than during said second portion.

* * * * *

UNITED STATES PATENT AND TRADEMARK OFFICE
CERTIFICATE OF CORRECTION

| | | |
|---|---|---|
| PATENT NO. | : 7,656,128 B2 | Page 1 of 1 |
| APPLICATION NO. | : 11/786651 | |
| DATED | : February 2, 2010 | |
| INVENTOR(S) | : Daniel C. Biggs, Jr. | |

It is certified that error appears in the above-identified patent and that said Letters Patent is hereby corrected as shown below:

Claim 12, Col. 8, Line 53, after "pulsator" insert -- , --.

Signed and Sealed this

Fourth Day of May, 2010

David J. Kappos
*Director of the United States Patent and Trademark Office*